Patented Oct. 24, 1933

1,932,183

UNITED STATES PATENT OFFICE 1,932,183

METHOD OF SEPARATING CERTAIN COMPONENTS FROM PINE OIL

Irvin W. Humphrey, Wharton, N. J., assignor to Hercules Powder Company, Wilmington, Del., a corporation of Delaware No Drawing. Application April 19, 1927
Serial No. 185,070

20 Claims. (Cl. 260—153)

My invention relates to the separation of certain components such as borneol, fenchyl alcohol, methyl chavicol, anethol and ketones from pine oil by means of selective dehydration combined with fractionation and refrigeration.

Pine oil, as is known, contains as components small proportions of terpenes and large amounts of certain oxygenated compounds including alpha-terpineol, terpineol, fenchyl alcohol, methyl chavicol, borneol, ketones and small amounts of other substances. Of the components of high grade steam distilled pine oil, the terpineols amount usually to from 55%–70%, the exact percentage depending largely upon the amount of hydrocarbons present in the pine oil. The hydrocarbons boil about within the range 155°–187° C. and comprise chiefly pinene, dipentene and terpinolene. They represent from about 5%–20% of the pine oil and are readily separated in the low end by fractionating the pine oil.

If the hydrocarbons are separated from pine oil by fractionating, a residue is left which has a boiling range of about 195°–235° C. and comprises alpha-terpineol B. P. 218° C., a terpineol B. P. around 210° C., fenchyl alcohol B. P. 202° C., borneol B. P. 212° C., methyl chavicol B. P. 216° C. anethol B. P. 233° C. and ketones. Since the terpineols are in preponderating proportion in the pine oil and the other components are each in relatively small proportion, it has heretofore been impractical to readily separate such other components from the terpineols in a high degree of purity, and hence from one another, by the fractionation of pine oil, though such components are severally of substantial value.

The two terpineols, alpha-terpineol and another terpineol, boiling at about 218° and about 210° C., respectively, may comprise two-thirds of the pine oil; the various other oxygenated compounds, boiling about within the range 195–233° C., individually represent only about 2 to 8% of the pine oil. Thus, it is evident that removal of the terpineols from the pine oil will greatly facilitate the isolation of each of the other oxygenated constituents.

Now, it is the object of my invention to provide a method whereby the fenchyl alcohol, borneol, methyl chavicol and anethol may be separately recovered from the pine oil.

The method embodying my invention comprises the treatment of pine oil in either liquid or vapor phase, with a substance which will partially chemically dehydrate the pine oil by selectively attacking the terpineols, breaking them down into water and hydrocarbons having a boiling range of about 170° C.–185° C., the other oxygenated components being effected by the reagent to only a small extent. When the terpineols have been broken down into hydrocarbons and water, their separation, along with the hydrocarbons originally contained in the pine oil, from the other oxygenated components may be readily effected by fractionation of the pine oil, either simultaneously with the breaking down of the terpineols or subsequently. Since the terpineols, B. P. 210–18° C., have been converted into hydrocarbons, B. P. 170–185° C., it is apparent that they may now be easily removed from the oxygenated components of the pine oil, all of which boil above about 195° C. The residue, which has a specific gravity of about 0.94 and boils largely between 190° C.–230° C., may then be readily fractionated, or fractionated and refrigerated, for the separate recovery of fenchyl alcohol, borneol, methyl chavicol, anethol and ketones.

In carrying out the method in accordance with my invention, I may use, for example, a halogen as iodine or bromine, iodine being preferred or I may use a surface catalyst such as fuller's earth, other argillaceous earths, silicious earth as kieselguhr, and activated carbon, as the chemical dehydrating agent for the treatment of the pine oil to effect the removal of the terpineols by converting them into hydrocarbons and water.

The most suitable reagents for the dehydration of the tertiary alcohols are either iodine or substances which act as surface catalysts, e. g. fuller's earth or activated carbon. Mineral acids and acid salts tend to dehydrate considerable proportions of the secondary alcohols (borneol and fenchyl alcohol) and in addition possess the disadvantage of producing a residual pine oil which may become acidic on fractionation on account of the breaking down of the unstable compounds which were previously formed between a portion of the pine oil and mineral acid.

As an example of the carrying out of the method embodying my invention, using iodine, which is preferred as the chemical dehydrating agent, to a quantity of pine oil is added iodine in the proportion of from 0.05%–1.0%, preferably say about 0.1%, and the hydrocarbons, having a boiling range of about 170° C.–185° C. including those originally in the pine oil and those formed by the splitting off of water from the terpineols by the action of the iodine, are distilled off. After distilling off the hydrocarbons there will remain a valuable residue amounting to from about 25%–50% of the pine oil, having a specific gravity of about 0.94, with the approximate boiling range: 5%—193° C., 20%—198° C., 50%—208° C., 70%—228° C. and 95%—230° C., which contains fenchyl alcohol, borneol, in substantial proportion, and methyl chavicol, anethol and ketones.

The amount of residue depends upon various factors including the composition of the original pine oil, amount and character of dehydrating agent, temperature and time of dehydration, thoroughness of fractionation from hydrocarbons, etc. In case the pine oil is subjected to heating at too high a temperature, or for an excessive period, or if very large proportions of the dehydrator are used, considerable amounts of high boiling polymerized hydrocarbons will be formed.

From the residue the high boiling polymerized hydrocarbons may be separated as a higher boiling residue and a refined distillate obtained, which will have a specific gravity of about 0.93, with the approximate boiling range: 5%—193° C., 20%—195° C., 50%—201° C., 70%—207° C., and 90%—218° C., and from which fenchyl alcohol, borneol, methyl chavicol, anethol and ketones may be readily recovered by fractionation supplemented by refrigeration.

Previous to fractionation, the residue may, if desired, be extracted with an aqueous solution of sodium bisulfite in order to remove traces of vanillin and other aldehydes, and then washed with aqueous sodium hydroxide, thus freeing it from small amounts of high boiling phenols.

For example, when either iodine or fuller's earth is employed about one-half of the borneol present in the residue and amounting to between about 2%–4% of the pine oil, will separate at room temperature and may be filtered out of the residue. The remaining components of the residue may be separated by fractionation and refrigeration.

In carrying out the process in accordance with my invention, the pine oil to which iodine has been added may be refluxed and the hydrocarbons formed by dehydration of the terpineols subsequently distilled off, the residue being fractionated and refrigerated for the separation of its various compounds.

In accordance with my invention, while I have found that iodine is highly advantageous for the selective dehydration of the pine oil in order to effect the breaking up of the terpineols, with subsequent removal by fractionation as hydrocarbons and water, surface catalysts including argillaceous earths as fuller's earth, silicious earth as kieselguhr, and activated carbon.

For example, where fuller's earth is used in place of iodine, it may be added to the pine oil in quantity from about 0.5%–5%, about 2% being preferred, and heated to 165–195° C. for two hours, preferably with agitation. The hydrocarbons formed are then removed by fractionation, leaving the residue from which the desired components of the pine oil are separable by fractionation and refrigeration.

In carrying out my process, if desired, the pine oil may be distilled and the vapors thereof contacted with fuller's earth, or other suitable selective dehydrator, and the hydrocarbons and the desired oxygenated substances fractionally condensed, the desired oxygenated components being subsequently separated by fractionation and refrigeration, or the vapors may be all condensed together with subsequent removal of the hydrocarbons and fractionation of the residue for the desired compounds.

It will be noted that in accordance with my invention there is provided a relatively simple and inexpensive method by which the more valuable components of pine oil may be readily obtained therefrom in a high state of purity.

It will be understood that I do not herein claim broadly the treatment of pine oil with fuller's earth, other argillaceous earths, silicious earths as kieselguhr, or activated carbon, as such forms the subject matter of an application for United States patent filed by me July 20, 1926, Serial No. 123,814; nor do I claim herein broadly the treatment of pine oil with a halogen, as iodine or bromine, as such forms the subject matter of an application for United States patent filed by me July 20, 1926, Serial No. 123,813.

Having now fully described my invention, what I claim and desire to protect by Letters Patent is:—

1. The method of separating certain oxygenated components from pine oil, which includes subjecting pine oil to the action of a non-acidic substance which will selectively chemically dehydrate its tertiary alcohols removing products of dehydration, and then fractionating the residual pine oil for the separation of the desired components.

2. The method of separating certain oxygenated components from pine oil, which includes subjecting pine oil to the action of a non-acidic substance which will selectively chemically dehydrate its tertiary alcohols, distilling off the hydrocarbons and products of dehydration from the residual pine oil and fractionating and refrigerating the residue for the separation of the desired components.

3. The method of separating certain oxygenated components from pine oil, which includes subjecting pine oil to the action of a surface catalyst in the presence of heat to effect selective dehydration of tertiary alcohols and fractionating the treated pine oil for the separation of the other desired components.

4. The method of separating certain oxygenated components from pine oil, which includes subjecting pine oil to the action of a surface catalyst in the presence of heat to effect selective dehydration of tertiary alcohols, distilling off the hydrocarbons which are formed from components of the treated pine oil and then fractionating and refrigerating the residue for the separation of the other desired components.

5. The method of separating certain oxygenated components from pine oil, which includes subjecting pine oil to the action of a non-acidic substance which will selectively chemically dehydrate its tertiary alcohols, distilling up to 190° C. to remove terpenes, and then fractionating and refrigerating the residue for the recovery of the desired components.

6. The method of separating certain oxygenated components from pine oil, which includes subjecting pine oil to the action of a surface catalyst in the presence of heat to effect selective dehydration of tertiary alcohols, distilling off the hydrocarbons, which boil below 190° C., and fractionating and refrigerating the residue for the recovery of the desired component.

7. The method of separating certain oxygenated components from pine oil, which includes subjecting pine oil to the action of fuller's earth in the presence of heat and fractionating the treated pine oil for the separation of the desired components.

8. The method of separating certain oxygenated components from pine oil, which includes subjecting pine oil to the action of fuller's earth in the presence of heat, distilling off the hydrocarbons which are formed from the treated pine oil and then fractionating and refrigerating the residue for the separation of the desired components.

9. The method of separating certain oxygenated components from pine oil, which includes subjecting pine oil to the action of a non-acidic substance which will selectively chemically dehydrate its tertiary alcohols, distilling off from the residual pine oil the hydrocarbons and products of dehydration as they are formed and fractionating and refrigerating the residue for the separation of the desired components.

10. The method of separating certain oxygenated components from pine oil, which includes subjecting pine oil to the action of a surface catalyst in the presence of heat, distilling off from the pine oil hydrocarbons as they are formed and then fractionating and refrigerating the residue for the recovery of the desired components.

11. The method of separating certain oxygenated components from pine oil, which includes subjecting pine oil to the action of a surface catalysts in the presence of heat to effect selective chemical dehydration thereof, distilling off the products of dehydration which boil below 190° C. as they are formed and fractionating the residue for the recovery of the desired components.

12. The method of separating certain oxygenated components of pine oil, which includes subjecting pine oil to the action of a surface catalyst in the presence of heat at a temperature to effect dehydration of tertiary alcohols and below that at which any substantial dehydration of secondary alcohols will be effected, distilling off the products of dehydration and then fractionating and refrigerating the residue for the separation of the desired components.

13. The method of separating certain oxygenated components from pine oil, which includes subjecting pine oil to the action of fuller's earth in the presence of heat at a temperature sufficient to effect substantial dehydration of tertiary alcohols without effecting any substantial dehydration of secondary alcohols, distilling off products of dehydration and then fractionating and refrigerating the residue for the separation of the desired components.

14. The method of separating secondary alcohols from pine oil, which includes subjecting pine oil to the action of a non-acidic substance which will chemically dehydrate the tertiary alcohols of the pine oil while avoiding any substantial dehydration of secondary alcohols, removing the products of dehydration and fractionating the residue for the separation of a secondary alcohol.

15. The method of separating borneol from pine oil, which includes subjecting pine oil to the action of a non-acidic substance which will chemically dehydrate the tertiary alcohols of the pine oil while avoiding any substantial dehydration of borneol, removing the products of dehydration and fractionating the residue for the separation of borneol.

16. The method of separating fenchyl alcohol from pine oil, which includes subjecting pine oil to the action of a non-acidic substance which will chemically dehydrate the tertiary alcohols of the pine oil while avoiding any substantial dehydration of fenchyl alcohol, removing the products of dehydration and fractionating the residue for the separation of fenchyl alcohol.

17. The method of separating borneol from pine oil, which includes subjecting the pine oil to the action of a surface catalyst in the presence of heat to effect dehydration of the tertiary alcohols of the pine oil while avoiding any substantial dehydration of borneol, removing the products of dehydration and fractionating and refrigerating the residue for the separation of borneol.

18. The method of separating borneol from pine oil, which includes subjecting the pine oil to the action of fuller's earth in the presence of heat to effect dehydration of the tertiary alcohols of the pine oil while avoiding any substantial dehydration of borneol, removing the products of dehydration and fractionating and refrigerating the residue for the separation of borneol.

19. The method of separating fenchyl alcohol from pine oil, which includes subjecting pine oil to the action of a surface catalyst in the presence of heat to effect dehydration of the tertiary alcohols of the pine oil while avoiding any substantial dehydration of fenchyl alcohol, removing the products of dehydration and fractionating and refrigerating the residue for the separation of fenchyl alcohol.

20. The method of separating certain oxygenated components from pine oil, which includes subjecting pine oil to the action of activated carbon in the presence of heat to effect selective chemical dehydration thereof, distilling off the products of dehydration which boil below 190° C. as they are formed and fractionating the residue for the recovery of the desired components.

IRVIN W. HUMPHREY.